(12) United States Patent
Carbonera Luvizon et al.

(10) Patent No.: US 11,704,778 B2
(45) Date of Patent: Jul. 18, 2023

(54) METHOD FOR GENERATING AN ADAPTIVE MULTIPLANE IMAGE FROM A SINGLE HIGH-RESOLUTION IMAGE

(71) Applicant: SAMSUNG ELETRÔNICA DA AMAZÔNIA LTDA., São Paulo (BR)

(72) Inventors: Diogo Carbonera Luvizon, São Paulo (BR); Henrique Fabricio Gagliardi, São Paulo (BR); Otavio Augusto Bizetto Penatti, São Paulo (BR)

(73) Assignee: SAMSUNG ELETRONICA DA AMAZONIA LTDA., Campinas (BR)

( * ) Notice: Subject to any disclaimer, the term of this patent is extended or adjusted under 35 U.S.C. 154(b) by 185 days.

(21) Appl. No.: 17/201,516

(22) Filed: Mar. 15, 2021

(65) Prior Publication Data
US 2022/0207663 A1    Jun. 30, 2022

(30) Foreign Application Priority Data
Dec. 30, 2020    (BR) ...................... 10 2020 027013 3

(51) Int. Cl.
*G06T 5/00* (2006.01)
*G06T 7/55* (2017.01)
*G06T 5/30* (2006.01)
*G06T 7/13* (2017.01)
*G06T 7/50* (2017.01)

(52) U.S. Cl.
CPC ................ *G06T 5/005* (2013.01); *G06T 5/30* (2013.01); *G06T 7/13* (2017.01); *G06T 7/50* (2017.01); *G06T 7/55* (2017.01); *G06T 2207/20064* (2013.01); *G06T 2207/20084* (2013.01)

(58) Field of Classification Search
CPC .............. G06T 5/005; G06T 7/50–596; G06T 2207/10028; G06T 2207/20084; G06T 2207/20081; G06T 5/30; G06T 7/13; G06T 2207/20064; G06T 2200/21; G06T 5/10; G06N 3/02–088; H04N 13/395
See application file for complete search history.

(56) References Cited

U.S. PATENT DOCUMENTS

| | | | |
|---|---|---|---|
| 9,361,734 B2 * | 6/2016 | Hattori | H04N 13/139 |
| 9,741,125 B2 | 8/2017 | Baruch et al. | |
| 2012/0169722 A1 * | 7/2012 | Hwang | H04N 13/111 345/419 |
| 2013/0162634 A1 | 6/2013 | Baik | |

(Continued)

FOREIGN PATENT DOCUMENTS

CN          112233165 A   *   1/2021

OTHER PUBLICATIONS

Li, Qinbo, and Nima Khademi Kalantari. "Synthesizing light field from a single image with variable MPI and two network fusion." ACM Transactions on Graphics (TOG) 39.6 (2020): 1-10. (Year: 2020).*

(Continued)

*Primary Examiner* — Ian L Lemieux

(57) ABSTRACT

A method to compute a variable number of image planes, which are selected to better represent the scene while reducing the artifacts on produced novel views. This method analyses the structure of the scene by means of a depth map and selects the position in the Z-axis to split the original image into individual layers. The method also determines the number of layers in an adaptive way.

8 Claims, 12 Drawing Sheets

(56) References Cited

U.S. PATENT DOCUMENTS

2015/0235408 A1    8/2015   Gross et al.
2020/0228774 A1*   7/2020   Kar .................... H04N 13/111
2021/0368157 A1*   11/2021   Overbeck ............. H04N 23/90

OTHER PUBLICATIONS

Shih, Meng-Li, et al. "3D Photography using Context-aware Layered Depth Inpainting." arXiv preprint arXiv:2004.04727v3 (2020). (Year: 2020).*

Kopf, Johannes, et al. "One Shot 3D Photography." arXiv preprint arXiv:2008.12298v2 (2020). (Year: 2020).*

Luvizon, Diogo C., et al. "Adaptive Multiplane Image Generation from a Single Internet Picture." arXiv preprint arXiv:2011.13317v1 (2020). (Year: 2020).*

Richard Tucker, et al., "Single-View View Synthesis with Multiplane Images", Computer Vision Foundation, 2020, 10 pages.

Tinghui Zhou, et al., "Stereo Magnification: Learning view synthesis using multiplane images", ACM Trans. Graph., vol. 37, No. 4, Article 65, Aug. 2018, 12 pages.

Pratul P. Srinivasan, et al., "Pushing the Boundaries of View Extrapolation with Multiplane Images", Computer Vision Foundation, 2020, 10 pages.

\* cited by examiner

METHOD FOR GENERATING AN ADAPTIVE MULTIPLANE IMAGE FROM A SINGLE HIGH-RESOLUTION IMAGE

CROSS-REFERENCE TO RELATED APPLICATION(S)

This application is based on and claims priority under 35 U.S.C. § 119 to Brazilian Patent Application No. 10 2020 027013 3, filed on Dec. 30, 2020, in the Brazilian Intellectual Property Office, the disclosure of which is incorporated by reference herein in its entirety.

TECHNICAL FIELD

The present invention relates a method for computing a set of adaptive multiplane images that can be used to represent a three-dimensional scene based on the scene geometry and color information. This representation is called adaptive multiplane image (AMI) and can be used to generate new views of a static scene, allowing a broad range of applications to benefit from realistic and immersive three-dimensional effects, resulting in a full perception of three-dimensionality by the viewer. Therefore, this invention is related to the fields of new view synthesis and three-dimensional effects generation from a single image, and could aggregate value to a broad range of devices equipped with digital display, such as Smartphones, Smart TVs, Tablets, Smart Glasses, Smart watches, etc.

The proposed method for computing an AMI produces a representation in an efficient way by optimizing the depth of each image layer in order to reduce the rendering artifacts and the memory footprint, resulting in better visual effects while requiring less computational effort. The method analyses both the image content and the geometric structure of the scene, which allows an optimization in the number of layers for representing the scene, as well as an optimization in the position of each layer to represent the scene content.

BACKGROUND

Novel view synthesis and three-dimensional (3D) effects generation from a single image are two fields closely related and widely used to provide a perception of depth. The generation of dynamic contents for digital displays is an important feature that has been more and more required for electronic devices equipped with a digital display, such as Smartphones, Smart TVs, etc. The visual effects are generally designed to provide entertainment and catch the users' attention. In this direction, 3D visualization of static scenes is a valuable eye-catching feature, in addition to offer an immersive and augmented reality perception.

Among the possibilities to provide 3D perception, the motion parallax effect is commonly used. Specifically, the parallax effect is the relative movement of objects at different depth in a three-dimensional scene, resulting in a perception of depth by the viewer. In this effect, objects closer to the observer appear to move faster relative to objects farther away. Once the geometry of the scene is known and well structured, other geometry-aware effects can be produced in order to enhance the perception of depth by the user, like Bokeh Effect, 3D Zoom In and Zoom Out, among others.

A common characteristic among these visual effects is the requirement for geometry information, frequently represented as a depth map. Currently, several methods and apparatus are capable of capturing the depth of a scene. For example, active sensors such as Time-of-Flight (ToF) or infrared (IR) depth sensors, or passive devices such as stereo pairs of cameras. However, such alternatives are frequently not available due to the lack of specific hardware devices, or even not possible for already captured images, e.g., for pictures from the Internet. Alternatively, convolutional neural networks (CNN) have recently demonstrated a capability to extract meaningful information from raw images. To cite a few examples, CNN can be used to perform image classification, object detection and localization, instance segmentation, image generation, image in-painting (e.g., filling the gaps in images), among many other tasks. Related to depth estimation, several methods have been recently proposed in the literature. For example, in "DORN: Deep Ordinal Regression Network for Monocular Depth Estimation", H. Fu et al., published in CVPR 2018, and in "High Quality Monocular Depth Estimation via Transfer Learning", I. Alhashin, 2018, deep CNN architectures, including the popular DenseNet, are used to predict depth maps. Other methods, as in "SharpNet: Fast and Accurate Recovery of Occluding Contours in Monocular Depth Estimation", M. Ramamonjusoa, published in ICCVW 2019, and in "Pattern-Affinitive Propagation across Depth, Surface Normal and Semantic Segmentation", Z. Zhang, published in CVPR 2018, additional informative data such as surface normal and segmentation masks is used to learn depth.

With the advents of deep learning, deep CNN architectures, and the availability of an enormous quantity of visual data, automatically generating 3D visual effects or novel views from a single image has become possible, even when no prior geometry information is available. Current methods are mainly based on three different types of data representation: point clouds, layered depth images (LDI), and multiplane images (MPI). Point clouds are the more complete representation for 3D scenes, including the more general case of plenoptic point clouds. However, rendering point clouds in low-memory and computationally restricted devices can be prohibitive, despite the fact that estimating a complete point cloud from a single image is also a difficult task and remains as an open problem. The LDI format has been proposed to represent a scene requiring low memory compared to point clouds, but also results in lower quality of generated new images.

Alternatively, the article "Single-View View Synthesis with Multiplane Images", published on CVPR 2020 by Tucker and Snavely, describes the MPI representation, which currently results in better quality when estimated from a single image.

The MPI representation consists of a set of parallel image planes, each one encoded as a transparent image (RGB-alpha), spaced one from another in a constant amount of disparity (inverse of the depth). In this representation, each part of the source image, i.e., the original image used to construct the MPI representation, can be encoded by a different image plane. A novel view is produced from an MPI by applying a perspective warping and a composite operation over the image planes. In this way, parts of the scene at different depths are rendered at slightly different positions and a 3D visual effect can be simulated by changing the position of the image planes or by changing the position of the virtual camera (observer) on which the image planes are warped.

The drawbacks of MPI are the sparsity of information and the elevated number of image planes frequently used to represent complex scenes with high fidelity. This limitation in the context of UHD images becomes prohibitive and hinders the applicability of this representation on embedded devices. Considering this fact, the present invention aims at reducing the memory and computations required to produce and render an MPI representation of a scene while maintaining the quality of the generated new views and produced 3D effects. For this, method for estimated an adaptive multiplane image (AMI) representation is proposed. Differently from traditional MPI, the number of layers in the AMI are estimated based on the geometry of the scene and the position of each image plane is determined by the image content. In this way, the method can represent complex scenes by a few and well localized image planes, allowing real-time 3D effects rendering on low-memory and computationally restricted devices, even for UHD images.

The patent document US20130162634A1, entitled "IMAGE PROCESSING METHOD AND APPARATUS USING MULTI-LAYER REPRESENTATION", published on Jun. 27, 2013 by SAMSUNG ELECTRONICS CO LTD describes a method where at least one layer is generated and extended to represent the reference view. The multilayer representation is a classical approach to animate characters in a simplified three-dimensional (3D) scenario. However, the process of automatic generating a multiplane representation that is satisfactory in terms of visual quality of the produced new views can be very complex and difficult to implement, especially on electronic devices with restrictions of memory and computational power. The accomplishment of the task of automatic generating a multiplane representation can be even more difficult in the case of a single monocular image as input. Differently from the aforementioned methods, in the present invention, it is proposed an efficient method to produce an adaptive multiplane representation, where individual layers are computed to reduce the artifacts produced in the target views and to reduce the total number of layers required to represent a complex scene.

The main advantage of a multiplane image representation when compared to other modalities of 3D scene representation (e.g., layered depth images, 3D shapes, 3D voxels) is its capability of being used to generate novel views of the scene in a simple manner.

Considering a naive image segmentation strategy, the extent of the parallax effect that can be performed for a given effect is limited by the amount of scale and motion that do not expose occluded regions (to avoid disocclusion) from the original image. For example, in patent document US20150235408A1, entitled "PARALLAX DEPTH RENDERING" published on Aug. 20, 2015 by Apple INC., it was proposed to perform a monotonically increase or decrease of the scale of segmented masks, in order to avoid this effect. However, depending on the content of the scene, even a cautiously pre-defined movement is not able to avoid exposing gaps in the multiplane layers. To handle this problem, inpainting the image gaps is required.

Furthermore, patent document US20150235408A1 describes an apparatus for performing a parallax depth-based rendering effect on which a generated depth map can be employed for image segmentation, separating the source image into multiple image patches, which are then animated to produce the desired parallax effect. However, no details are provided about the method for segmentation, which is a challenging problem, especially when considering a single source image. In the present invention, it is proposed a method that can generate an adaptive multiplane image (AMI) representation, which also considers an inpainting method for filling occluded regions and a rendering method for automatically producing new views of the reconstructed 3D scene. The superiority of this approach is observed qualitatively and quantitatively when compared to a simple and non-adaptive segmentation strategy.

Patent document US9741125B2, entitled "METHOD AND SYSTEM OF BACKGROUND-FOREGROUND SEGMENTATION FOR IMAGE PROCESSING", published on Aug. 22, 2017, by Intel Corporation, considers an adaptive generation of multiplane images by proposing a method to determine a simple boundary between image pixels lying in the background of the scene and pixels belonging to the foreground objects. However, this approach is limited to only two image planes, which does not allow a real 3D perception of the scene. Differently, the present invention is flexible in the generation a variable number of image planes, which can be easily parametrized to produce the best quality versus computational cost compromise.

The MPI representation was originally designed to be learned from stereo image pairs, as proposed in the article entitled "Stereo Magnification: Learning view synthesis using multiplane images", published on SIGGRAPH 2018 by Zhou et al. A common problem that results from indirectly learned MPI representation is its fuzziness about what part of the source image each layer represents. Since the process of indirectly learning an MPI implies no constraints in the content of each image plane, several layers have to be estimated to result in clear and realistic 3D effects.

In this direction, the article entitled "Pushing the Boundaries of View Extrapolation with Multiplane Images", published on CVPR 2019, by Srinivasan et al., proposes the use of 3D convolutions to produce a set of 128 image planes that represent the depth and color information of the scene with better granularity. The downside of this strategy is that rendering such a number of image planes in UHD becomes prohibitive for most of the applications, such as in Smartphones and Smart TVs.

SUMMARY

The present invention relates to handling previously mentioned problems related to novel view synthesis by proposing an adaptive multiplane image (AMI) representation. When rendered to a new point of view, the proposed AMI can produce new views of a scene, which can be arranged sequentially in order to generate a visual 3D effect from a static picture.

Moreover, in the present invention, it is proposed a method to compute a variable number of image planes, which are selected to better represent the scene while reducing the artifacts on produced novel views. This method analyses the structure of the scene by means of a depth map and selects the position in the Z-axis to split the original image into individual layers. The proposed method also determines the number of layers in an adaptive way.

Additionally, it is also proposed the use of lightweight CNN architectures integrated with Time-Frequency Decomposition (TFD), for example, the Discrete Wavelets Transforms (DWT), resulting in a method for estimating depth maps from high-resolution images with low computational cost. Similar CNN architectures can also be used to perform image inpainting in the gaps produced in the AMI representation. This integrates the present invention in order to allow an AMI estimation from a single image, even when no depth information is provided. As a result, the produced AMI can be generated from a single high-resolution image and rendered on low-memory devices in an efficient way.

BRIEF DESCRIPTION OF THE DRAWINGS

The objectives and advantages of the current invention will become clearer through the following detailed description of the example and non-limitative drawings presented at the end of this document.

DETAILED DESCRIPTION

One of the reasons that previous methods require an elevated number of image planes is that, traditionally, such planes are computed in a fixed grid, without explicitly taking into account the content of the image.

Figure 1:
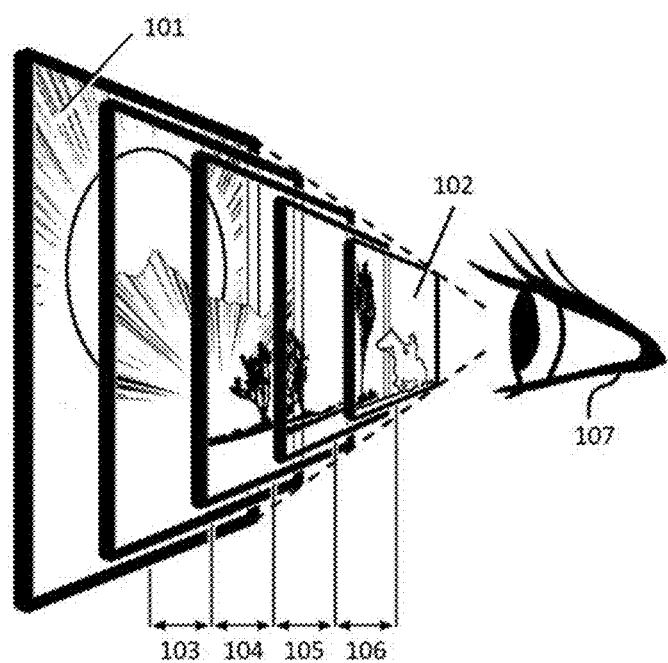
FIG. 1 presents a Multiplane Image (MPI) representation of a scene with constant interval between layers.

For example, in FIG. 1 an MPI representation from a scene is shown with five illustrative image planes aligned in the Z-axis with respect to the observer 107. In this example, the gap between each layer is defined in a fixed grid from the layer lying in the far Z 101 to the layer in the near Z 102. The calculation of this fixed grid in the Z-axis is usually performed in the disparity domain, which is equivalent to the inverse of the depth. This process produces a set of layers with fixed intervals 103, 104, 105, and 106.

Figure 2:
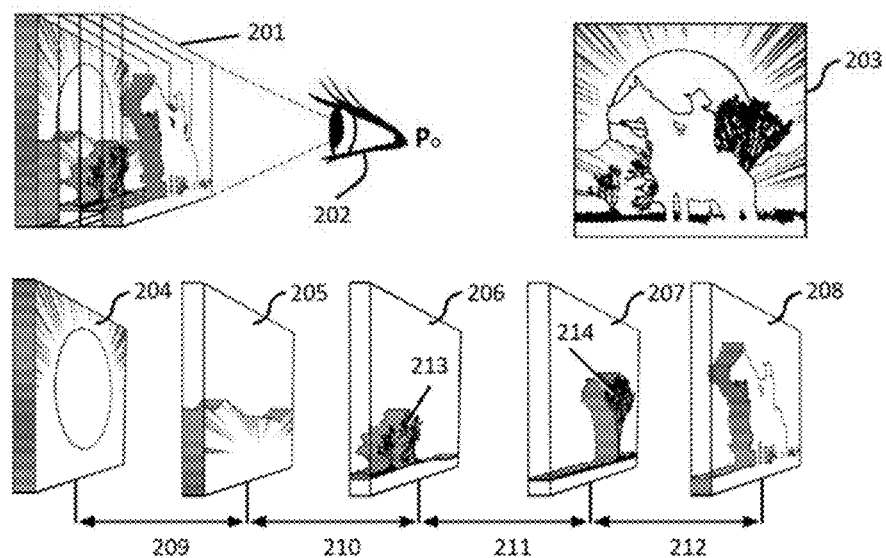
FIG. 2 presents the process of rendering an MPI with image planes at a fixed grid interval.

FIG. 2 shows a more detailed illustration of the rendering process of an MPI representation based on a fixed grid. The multiplane image layers in 201 are rendered considering an observer 202 at position Po, resulting in the image 203. In this example, five image planes, 204, 205, 206, 207, and 208 are equally spaced as represented by the intervals 209, 210, 211, and 212. For such representation of the scene, the gap produced between the layers 206 and 207 does not accurately represent the real distance between the trees 213 and 214. This effect can result in artifacts on a rendered new view.

Traditionally, a common strategy to reduce this undesirable effect is to increase the number of layers, as previously mentioned. However, this strategy also increases the computational requirements, i.e., memory and computational power, to compute, store, and render the produced MPI representation.

Figure 3:
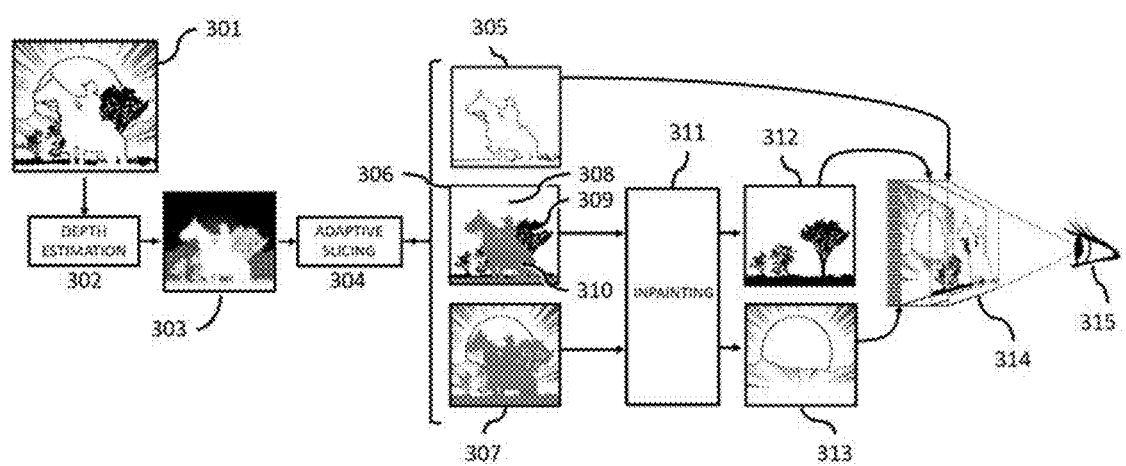
FIG. 3 illustrates an Overview of the present invention for generating an adaptive multiplane image from a high-resolution image.

In this sense, the method proposed by the present invention is divided into three main modules: (i) depth estimation module, (ii) adaptive slicing module, and (iii) inpainting module. In the proposed pipeline, as illustrated in FIG. 3, a single high-resolution image 301 is processed by the depth estimation step 302, which produces a depth map 303. If the depth map 303 corresponding to the image 301 is already available, the depth estimation process performed by the depth estimation step 302 can be skipped. This could happen for capturing devices equipped with a depth sensor, such as time-of-flight sensors or a similar apparatus capable of predicting a depth map.

Then, the depth map 303 is processed by the adaptive slicing step 304, which produces a set of partial image planes 305, 306, and 307, which depends on the content of the image represented by the depth map. The partial image planes are composed by three different regions: (i) actual color image 309, which is a copy from the input image; (ii) transparent regions 308, which allow colors from precedent layers to appear in the rendered view; and (iii) occluded regions 310, which correspond to the pixels that are not visible at this image layer.

The partial image planes that have occluded regions, e.g., 306 and 307, are processed by the inpainting step 311. This step produces a color texture that will be inpainted in the occluded regions (e.g., in 310), resulting in the inpainted image planes 312 and 313. The resulting image planes from this process, in this case 305, 312, and 313, are then arranged to form the AMI representation 314, which can be rendered to a new point of view 315.

The main advantage of the present invention is in the adaptive slicing module, which produces a set of partial images planes. Differently from the state of the art, the number of partial image planes generated depends on the content of the image represented by the depth map. Moreover, each partial image plane has a depth position (in the Z-axis) computed to better represent the scene, instead of using a fixed grid. This information is also computed by the adaptive slicing module.

Moreover, CNN architectures are used for depth estimation and image inpainting, which uses the Discrete Wavelet Transform (DWT), or any other Time-Frequency Decomposition (TFD), to achieve high-resolution estimation with low-memory requirements. This allows the method to compute an AMI representation in higher image resolution compared to previous methods, while requiring less memory and less computation time.

The goal of the depth estimation step is to obtain a depth map, i.e., a matrix representation with the same number of columns and rows of the input image, where each value represents the distance from the observer to the 3D scene surface represented in the input image. Despite this information could be obtained by a dedicated apparatus, such as time-of-flight sensors, stereo vision approaches, etc., for the vast majority of images captured by current devices such as Smartphones, digital cameras, etc., the depth information could not be available. Therefore, in the present invention the possibility to include this step to estimate the depth information from a single-color image is also included.

Estimating depth from a single image uses deep learning and deep neural networks. In this sense, convolutional neural networks (CNN) can perform this task satisfactorily. To mitigate the high computational consumption associated with these strategies, it's proposed the use of a TFD in conjunction with convolutional filters to reduce the required memory of the network.

Figure 4:
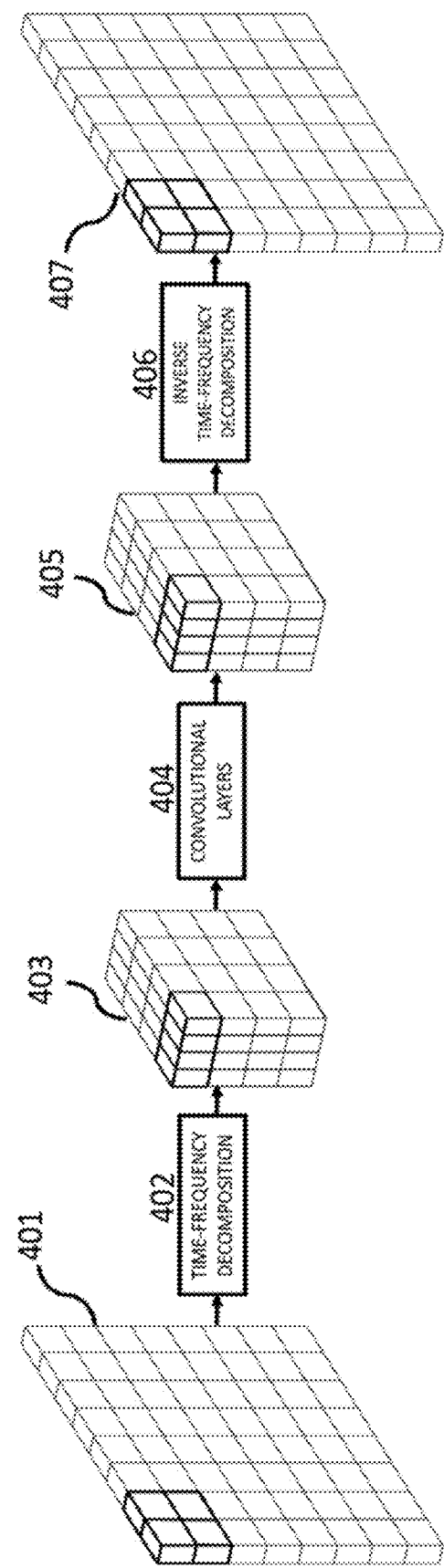
FIG. 4 illustrates the Convolutional Neural Network (CNN) associated with Time-Frequency Decomposition (TFD).

This method is illustrated in FIG. 4, where an input image or feature map 401 is fed to a TFD layer 402, resulting in a new feature map 403 with half of the input resolution (in number of rows and columns), and with four times more features in the channels dimension. Then, a sequence of convolutional layers 404 is applied to generate a new set of coefficients or features 405, which are transformed back to the original resolution by an Inverse Time-Frequence Decomposition (I-TFD) 406.

Despite the tensors 403 and 405 having the same number of features as in 401 and 407 respectively, the channels after the TFD are compact in the spatial dimensions and arranged accordingly to specific frequency responses in the channels dimension, as a characteristic of the Time-Frequency Transforms. Due to this arrangement, satisfactory results are achieved by using more compact convolutional filters, with a similar number of filters in the channels dimension, but with smaller filters size, if compared to convolutional layers applied directly in the input 401. As a result, an efficient CNN can be implemented with smaller convolutional filters, therefore requiring less memory and lower computations if compared to traditional CNN architectures.

Multiple blocks of TFD layers, convolutional layers, and inverse TFD layers can be arranged in a structured way to implement a CNN architecture. The final CNN can be trained on annotated depth data, or on stereo pair of images for disparity estimation, in order to predict a depth map or a disparity map from an input high-resolution color image.

Additionally, the method was evaluated by using the Discrete Wavelet Transform (DWT) due to its simplicity, but any other TFD could be used, such as Short-Time Fourier Transform, Gabor Transform, Bilinear Time-Frequency Distribution, among others.

The main contribution of the present invention is the adaptive slicing module. Considering a depth map predicted by a CNN or produced by a specific depth estimation apparatus, the goal of this step is to generate a set of partial image planes, each lying in a specific depth distance in the Z-axis, accordingly to the image content, in order to better represent the 3D scene. The main idea of this algorithm is to slice the scene in regions of high discontinuities, such as in the boundaries of objects or in the regions of borders. In this way, the boundaries of the generated image planes tend to follow the structure of the scene, which prevents from creating border artifacts. In addition, if some regions in the depth are empty (no object or structure lying in a given range of depth), no additional image plane will be placed at this region.

Figure 5:
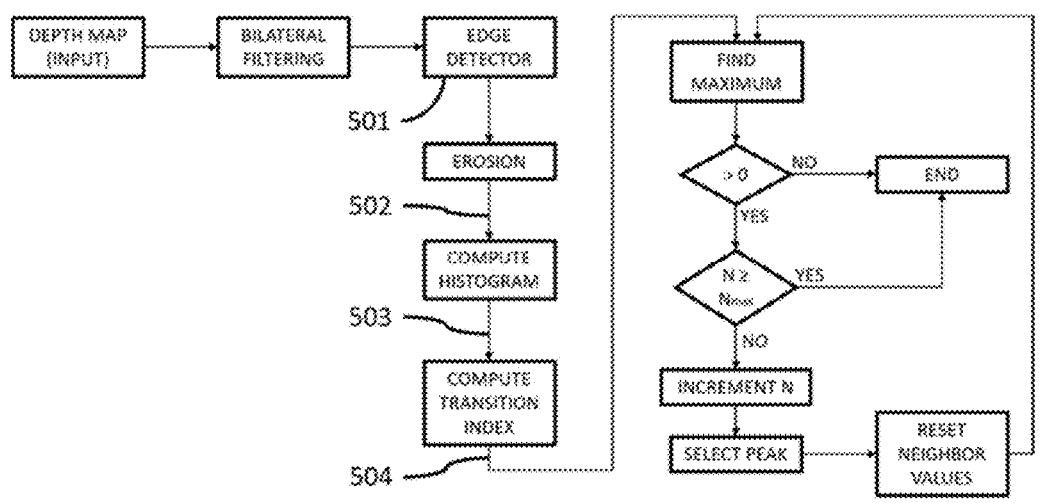
FIG. 5 depicts a diagram of the adaptive slicing algorithm, where N and $N_{max}$ are the current and the maximum number of image planes, respectively.

The diagram illustrated in FIG. 5 presents an overview of the adaptive slicing method. Since depth maps estimated by CNN or by other means are susceptible to noise and imprecise borders, a filtering process is firstly applied in the input depth map. This process can be implemented by any kind of smoothing and border-preserving filter, such as a bilateral median filtering.

Figure 6:
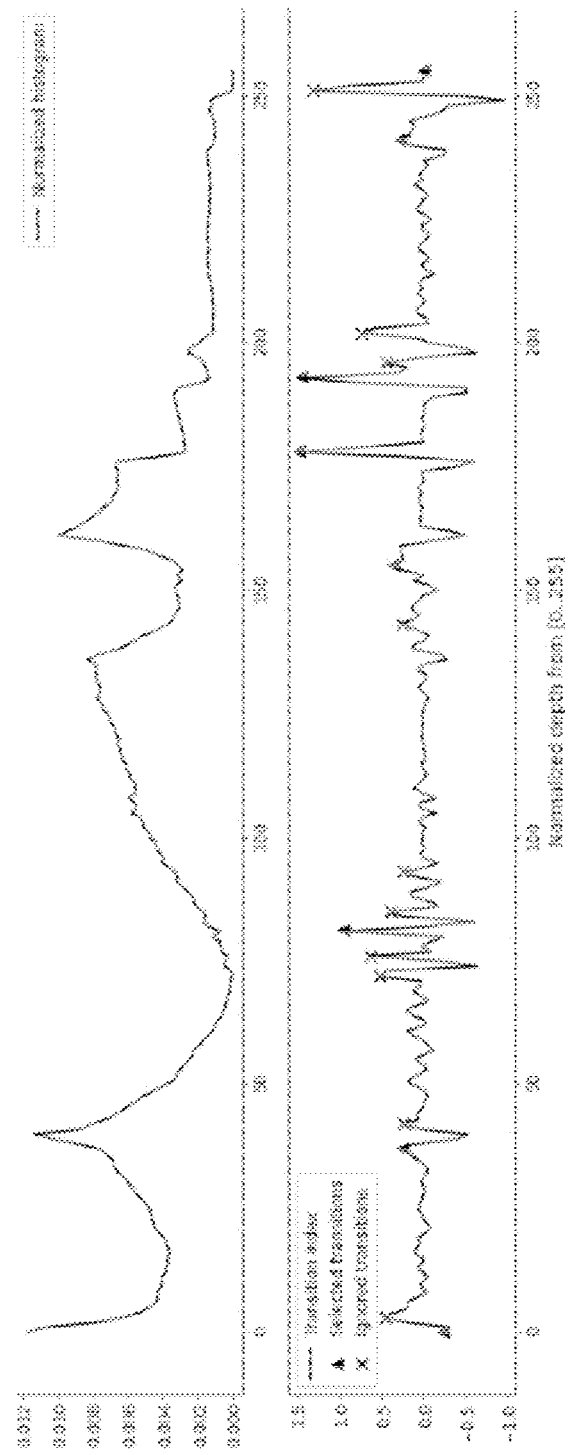
FIG. 6 depicts an example of depth histogram and the selection of transitions based on the transition index.

Then, an edge detecting step is applied in the filtered depth map in order to detect transitions in the structure of the scene. Examples of edge detectors for this process are Canny, Sobel, Prewitt, or Roberts operators, among others. The depth values corresponding to the detected borders in 501 are set to zero, so the resulting depth map has abrupt border regions, passing through zero. In order to increase the gap between two regions of different depth, a morphological erosion operation is applied, resulting in a border-aware depth map 502. At this point, the normalized histogram, represented by h, is then used to compute the transition index $\Gamma$, defined by the follow equation:

$$\Gamma = \frac{\Delta^2 h}{h}$$

which represents the normalized second derivative of the depth map histogram. The transition index $\Gamma$ is a vector with the same size as the histogram h and represents the normalized transitions in the histogram. The higher the values in $\Gamma$, the more abrupt is the normalized transition in h. In the diagram of FIG. 5, the arrows in 503 and 504 represent these vectors. An example of these two vectors from a real depth map is also depicted in FIG. 6.

Peaks from the transition index vector are selected as candidates for layer transitions. This process is demonstrated in the right part of the diagram in FIG. 5. Once a non-zero value is selected from $\Gamma$, if the current number of layers N is lower than the maximum number of layers $N_{max}$ i N is incremented and the selected value from $\Gamma$ is stored as a peak. Then, the neighbors from the selected value are set to zero (reset), so the neighbor peaks will not be selected in the next iteration.

The number of neighbors to be set to zero is a parameter from the algorithm and can be defined accordingly to the number of bins in the depth map histogram and on the maximum number of image planes. Due to this process, some peaks are intentionally ignored in the process, as can be seen in FIG. 6 by the cross markers. Since the extremities of the histogram are pre-selected to define the boundaries in the range of depth values, the peaks close to the borders were ignored. In addition, peaks close to the previously selected values (higher values) are also ignored.

In the end of the process described in FIG. 5, a number of $N < N_{max}$ transitions will be selected. Then, each partial image plane is defined as the interval between two transitions, resulting in N−1 image planes. The depth of each image plane is then defined as the average depth in the considered interval. In this way, the average error between the real depth value and the image plane depth is minimal.

The main advantage of using the proposed adaptive slicing step compared to a slicing method based on a fixed grid is that adaptive image planes represent the content of the image with more precision.

Figure 7:
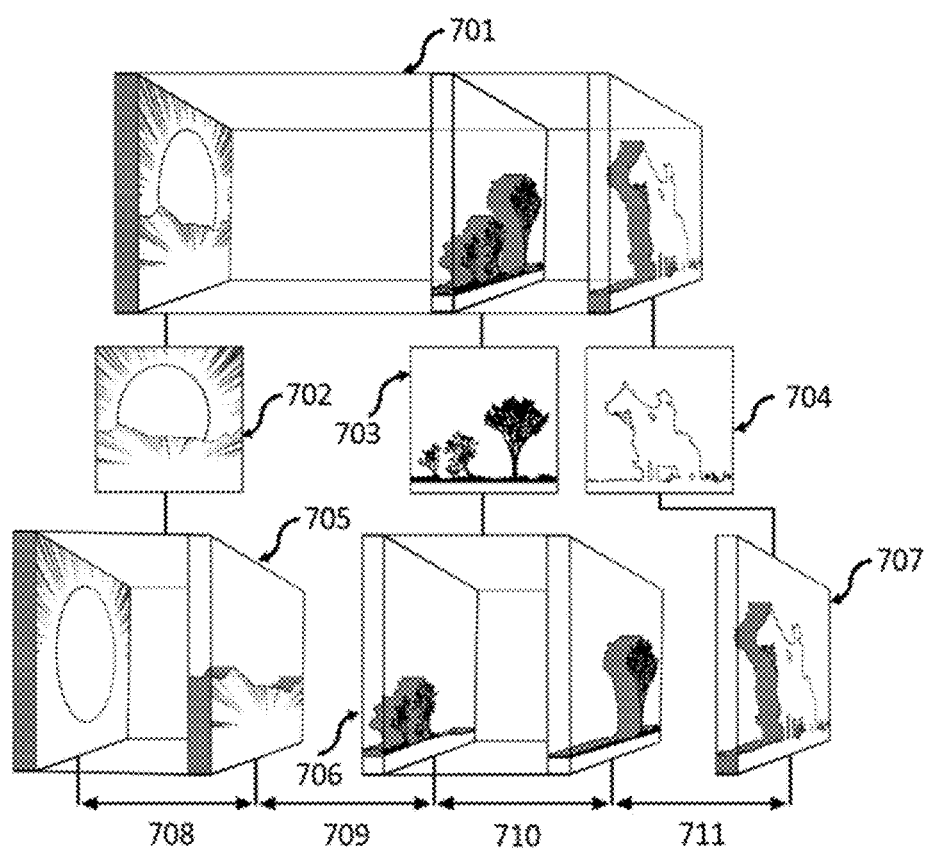
FIG. 7 depicts a comparative example of the proposed adaptive slicing algorithm and the traditional slicing method based on a fixed grid.

As an example, in FIG. 7, an adaptive multiplane image in 701 composed of three image planes, 702, 703, and 704, is compared with an equivalent MPI composed of five planes, on which the layer 702 is equivalent to two layers in 705, 703 is equivalent to two layers in 706, and 704 is equivalent to a single layer in 707. In the final AMI (701), the distance between the image planes is adapted to the content of the image, contrarily to the fixed interval from traditional MPI, from 708 to 711.

Once the partial image planes are computed, the occluded regions need to be inpainted, to avoid showing the gaps between layers during the novel view synthesis of the scene. As previously illustrated in FIG. 3, the regions that require inpainting (310) correspond to portions of image layers that are covered by a non-transparent layer closer to the camera, i.e., with lower depth value. This process could be performed by classic inpainting techniques from the state of the art, such as Telea's algorithm.

The solution adopted in the present invention for the problem of image inpainting is a CNN based on TFD, as previously discussed and illustrated in FIG. 4. The difference between the CNN used for depth estimation and the CNN used for image inpainting is that the former predicts a single channel map, corresponding to the depth map, and in the latter, the CNN predicts three channels, corresponding to red, green, and blue (RGB) colors.

In order to handle a variable number of image planes, the inpainting process operates in a single image layer. The goal of the inpainting in this context is to produce color pixels in occluded regions of a given image layer. Therefore, during the training process, regions from a given image are removed from the network input. These same regions are provided as targets for the optimization processes, in order to drive the learning process to optimize the network to generate pixel values that are similar to the original pixels removed from the input. This is a standard training process for inpainting. The difference in this process presented in this invention is in the way that the hidden region in the input image is defined.

Figure 8:
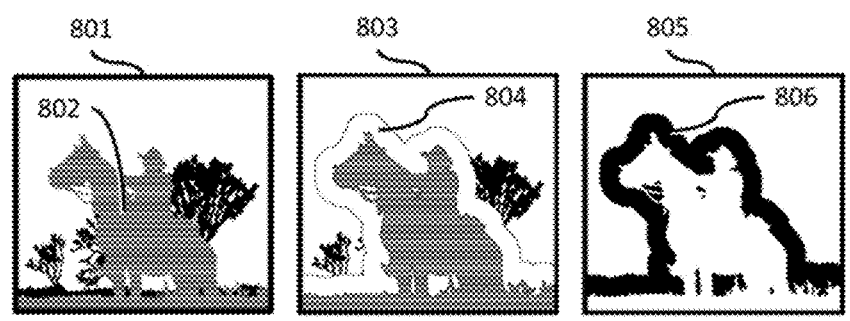
FIG. 8 illustrates the definition of hidden region for training the inpainting process.

This process is illustrated in FIG. 8, where the image layer 801 has the region corresponding to the foreground 802 occluded. In this layer, it is applied a morphological dilation 804 in the occluded region, resulting in the input image frame 803 for training the inpainting model. Then, a binary mask 805 corresponding to the removed regions 806 is defined and used to compute the target color pixels. The color pixels provided to supervise the model correspond to the pixels from the image 801, masked by the removed regions 806. After the model training, during inference, the image layer 801 is fed to the model and the pixels generated in the region 802 are used as inpainting.

Contrarily to classical inpainting methods, on which the model is trained with simple geometric crops from the input image for supervision, such as random squares and rectangles, in the present method the scene structure is considered to define the target region, as illustrated in 806. This process guides the model to learn an inpainting that is coherent with the context, i.e., foreground or background portions of the image.

Figure 9:
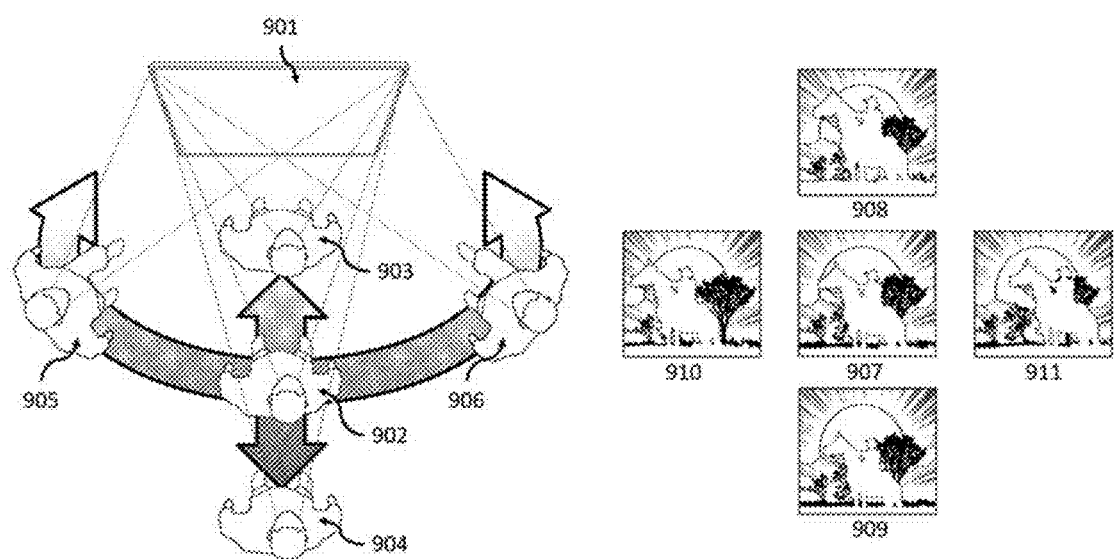
FIG. 9 illustrates a use case of the present invention in a virtual window application.

Moreover, the present invention could be adapted to a broad range of applications based on 3D visual effect, novel views synthesis, or dynamic content creation. For such applications, the methods and algorithms presented in the present invention can be implemented on specific hardware devices, such as Smartphones, Smart TVs, and other devices equipped with one or more processors and memory and/or permanent storage, or digital screens for displaying the results produced by the visual effect. The specific implementation can change accordingly to different devices and, as an illustrative example, could follow the following scheme: an image 301, stored in the device's memory, is processed accordingly to the method described in the present invention, in a such way that the individual steps are performed by the processor and the result 314 containing the AMI representation can be immediately used for synthesizing the effect in the device's screen or stored for future use. Each layer of the AMI representation can be stored as a binary file, with our without compression, along with the respective position in the Z axis for each layer, for a subsequent synthesis of the effect. In what follows, it is shown how the method could be applied, but not limited, to three different use cases:

I) A virtual window application is illustrated in FIG. 9. In this scenario, a Smart TV or a display apparatus 901 emulates a virtual window for an observer in 902. The display apparatus 901 can be equipped with a sensor mechanism to detect the position of the observer and render the AMI accordingly. For a given scene being rendered in 901, the observer at its initial position 902 sees the produced image as illustrated in 907. If the observer moves to its right in 906, the rendered scene changes accordingly, as shown in 911. In this case, the mounted horse moved faster relative to the threes and the sky, because it is closer to the observer. The same effect can be observed for the observer at positions 903, 904, 905 and the corresponding rendered views in 908, 909, and 910.

Figure 10:
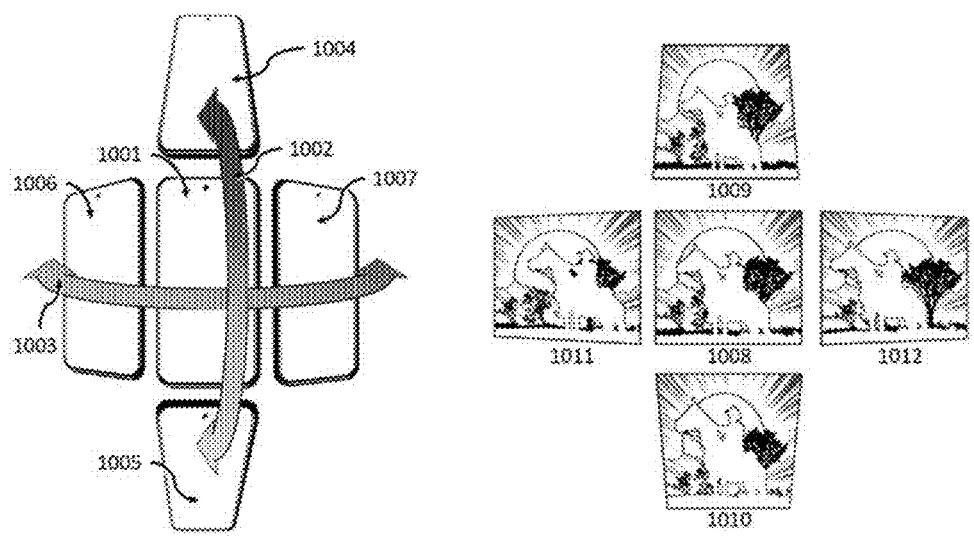
FIG. 10 depicts a use case of the present invention in a dynamic photo application on Smartphone.

II) Another possible application with the present invention is the creation of a dynamic photo for Smartphones, as illustrated in FIG. 10. In this example, a Smartphone 1001 displays a rendered view 1008 from an AMI computed from a picture accordingly to the Smartphone device position. If the device moves horizontally 1003, from the position 1006 to 1007, the rendered view changes accordantly from 1011 to 1012. In a similar way, a vertical movement 1002 with the device from 1004 to 1005 produces rendered views that change from 1009 to 1010. The device's movement could be estimated by the accelerometer or gyroscope. The produced visual effect provides a notion of depth to the user, since closer objects appears to move faster than parts of the image farther away. Therefore, the picture seems as a dynamic photography, improving the user experience.

Figure 11:
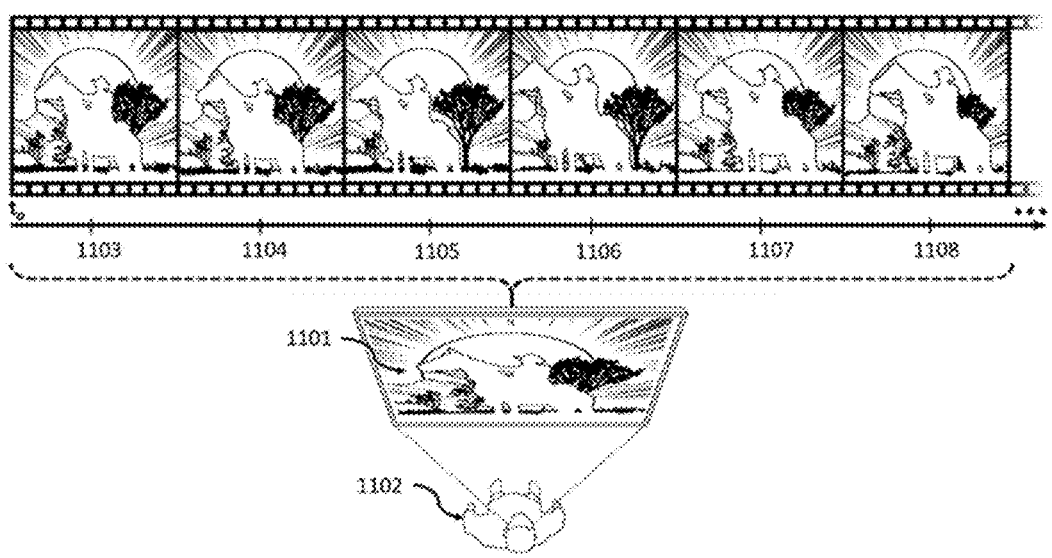
FIG. 11 depicts a use case of the present invention for 3D effect generation from a static photo.

III) FIG. 11 illustrates a case of use of the present invention applied to generate a video of 3D effect from a single and static photo. In this example, a Smart TV or a display device 1101 renders an AMI representation in real time, producing a video sequence observed by the user 1102. Each video frame 1103, 1104, 1105, etc., is rendered in real time by the display device 1101. This application could be used to animate static pictures, such as landscape or portrait photos, in a more realistic manner, providing to the user a notion of depth in the scene.

Additionally, the effectiveness of the present invention is evaluated on the depth estimation and novel view synthesis tasks. Although the present invention is not completely dependent on estimated depth maps for the cases when a depth sensing apparatus is available, it could be commonly applied to user scenarios where no depth information is provided, therefore requiring an estimated depth map. In addition, the quality of the generated novel views was evaluated by considering the efficiency aspect. Both experimental setups are detailed next.

The proposed depth estimation method is evaluated by comparing it with state of art approaches on the well know and public NYUv2 depth dataset, published by Silberman et al., on ECCV 2012. Four different metrics were considered:

Threshold:

$$\% \text{ of } y_i \text{ s.t. } \max\left(\frac{y_i}{y_i^*}, \frac{y_i^*}{y_i}\right) = \delta < thr$$

where $y_i$ and $y_i^*$ are the predict and ground truth depth values and thr is defined as 1.25, $1.25^2$, and $1.25^3$ respectively for $\partial_1$, $\partial_2$, and $\partial_3$. In this metric, higher is better.

Abs. Relative Error:

$$\frac{1}{|T|}\sum_{y \in T}|y - y^*|/y^*$$

where T represents the evaluation samples. In this metric, lower is better.

RMSE (linear):

$$\sqrt{\frac{1}{|T|}\sum_{y \in T}\|y_i - y_i^*\|^2}$$

RMSE (log):

$$\sqrt{\frac{1}{|T|}\sum_{y_i \in T} \|\log y_i - \log y_i^*\|^2}$$

Table 1 presents results obtained with the present invention compared to previous methods from the state of the art, as well as the present invention considering a classical CNN architecture and the proposed DWT-based CNN.

Considering the use of the proposed DWT-based CNN, it represents an improvement compared to a classic CNN (without DWT) of 11.5% in the RMSE (linear) metric, while reducing the model size from 17 to 16 MB. This demonstrates that the proposed structure using DWT in conjunction with convolutional filters not only allows a compact model but also improves its accuracy.

| Method | $\partial_1$ | $\partial_2$ | $\partial_3$ | Abs. Rel. Error | RMSE (lin) | $\log_{10}$ | Model size |
|---|---|---|---|---|---|---|---|
| DORN (CVPR' 18) | 0.828 | 0.965 | 0.992 | 0.115 | 0.509 | 0.051 | 421 MB |
| Pattern-Affinitive (CVPR' 19) | 0.846 | 0.968 | 0.994 | 0.121 | 0.497 | — | — |
| SharpNet (ICCVW' 19) | 0.888 | 0.979 | 0.995 | 0.139 | 0.495 | 0.047 | — |
| DenseNet (arXiv' 18) | 0.846 | 0.974 | 0.994 | 0.123 | 0.465 | 0.053 | 165 MB |
| Present invention (classic CNN) | 0.751 | 0.938 | 0.984 | 0.168 | 0.601 | 0.072 | 17 MB |
| Present invention (DWT-based CNN) | 0.800 | 0.956 | 0.989 | 0.149 | 0.532 | 0.063 | 16 MB |
| Present invention (DWT, rigid alignment) | 0.861 | 0.960 | 0.982 | 0.117 | 0.422 | 0.055 | 16 MB |

Compared to previous methods, the present invention is slightly less precise than recent approaches based on very deep CNN architecture, such as DenseNet. However, the method is one order of magnitude smaller (from 165 MB to 16 MB), which is the main concern in this invention. In addition, scores were also reported considering a rigid alignment between predictions and ground truth depth maps (based on median and standard deviation) in the last row of the table, since the present method for novel view synthesis is invariant to the scale and shift of the depth map prediction.

The present invention was also evaluated by considering the quality of the generated novel views from a single high-resolution image. Since in this task no ground-truth is available (considering unconstrained pictures taken from a non-static scene), the following methodology was adopted: assuming that a scene represented by a relatively large number of image planes can be projected to a new point of view with a high scene fidelity, and the rendered image can be considered as a ground-truth image. Then, comparing two different strategies for generating an MPI representation with few image planes: 1) uniform (fixed grid) slicing and 2) the proposed adaptive slicing approach.

Figure 12:
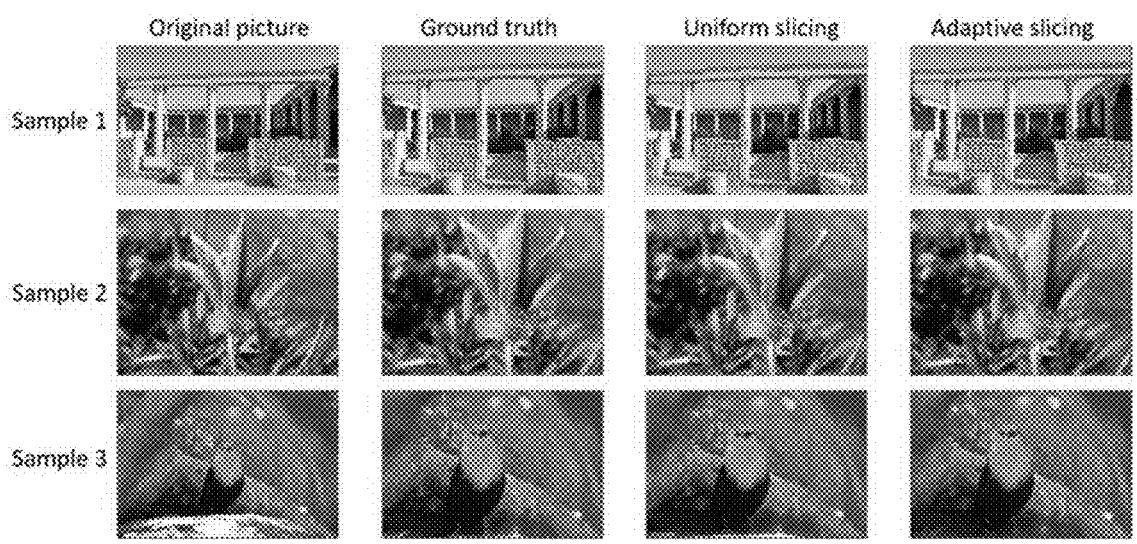
FIG. 12 illustrates the qualitative results of the proposed invention (adaptive slicing) compared with uniform slicing.

Standard image evaluation metrics are used to compare the proposed adaptive slicing algorithm with a uniform slicing approach, considering the same number of image layers. Specifically, the Structural Similarity (SSIM) and the Peak Signal-to-Noise Ratio (PSNR) metrics were used to compare the projected AMI (or MPI for uniform distribution) with the considered ground truth based on a high number of image planes. In these experiments, the ground truth was defined to have MPI formed by 64 image planes, and the evaluated AMI and MPI to have up to 8 image planes. In FIG. 12 it is presented qualitative results and, in the table below, the metric results for these sample images.

These examples demonstrate that the AMI produced by the adaptive slicing algorithm results in a higher similarity with the ground truth image when compared to the uniform MPI representation, even when using a smaller number of image planes. This fact can be observed from FIG. 12, where the artifacts produced by the uniform slicing are more salient than the artifacts produced by the adaptive slicing, but also from the table below, on which the SSIM and PSNR metrics from the present invention are higher and the effective number of image layers is lower.

| Image | Method | SSIM | PSNR | Effective number of layers |
|---|---|---|---|---|
| Sample 1 | Uniform slicing | 0.563 | 17.600 | 8 |
|  | Adaptive slicing | 0.600 | 18.086 | 7 |
| Sample 2 | Uniform slicing | 0.706 | 20.290 | 8 |
|  | Adaptive slicing | 0.830 | 22.872 | 4 |
| Sample 3 | Uniform slicing | 0.837 | 24.277 | 8 |
|  | Adaptive slicing | 0.874 | 26.212 | 6 |

Finally, the present invention was evaluated in a set of more than 500 high-resolution publicly available images collected from the Internet. The average results of the SSIM and PSNR metrics are presented in the table below, which confirms the superiority of the present invention when compared to a uniform slicing approach.

| Method | SSIM | PSNR |
|---|---|---|
| Uniform slicing | 0.660 | 20.488 |
| Adaptive slicing | 0.723 | 21.969 |

The invention may include one or a plurality of processors. In this sense, one or a plurality of processors may be a general purpose processor, such as a central processing unit (CPU), an application processor (AP), a graphics-only processing unit such as a graphics processing unit (GPU), a visual processing unit (VPU), or an AI-dedicated processor such as a neural processing unit (NPU).

The processors control the processing of the input data in accordance with a predefined operating rule stored in the non-volatile memory and/or the volatile memory. The predefined operating rule model is provided through training or learning.

In the present invention, being provided through learning means that, by applying a learning algorithm to a plurality of learning data, a predefined operating rule of a desired characteristic are made. The learning may be performed in a device itself in which it may be implemented through a separate server/system.

The learning algorithm is a technique for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the present invention has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

What is claimed is:

1. A method of generating an adaptive multiplane image (AMI) from a single image, comprising:
   receiving the single image as an input;
   generating a depth map by performing a depth estimation process;
   performing adaptative slicing of the single image into partial image planes;
   processing the partial image planes with occluded regions by inpainting; and
   rearranging resulting image planes to form a AMI representation,
   wherein the generating of the depth map comprises:
     feeding the input to a Time-Frequency Decomposition (TFD) layer in a new feature map with half of an input resolution and with four times more features in a channel dimension;
     applying a sequence of convolutional layers;
     generating a new set of wavelet coefficients; and
     transforming the new set of wavelet coefficients to the input resolution by an Inverse Time-Frequency Decomposition (I-TFD).

2. The method as in claim 1, wherein the adaptative slicing comprises:
   receiving the depth map;
   applying a filtering process in the depth map;
   applying an edge detector to the filtered depth map;
   setting a depth value of detected borders to zero;
   applying a morphological erosion operation, generating a border-aware depth map; and
   computing the transition index $\Gamma$ vector by using the normalized histogram h:

$$\Gamma = \frac{\Delta^2 h}{h}.$$

3. The method as in claim 2, wherein peaks detected from the transition index vector are selected as candidates for layer transitions.

4. The method as in claim 3, wherein in the adaptative slicing once a non-zero value is selected from $\Gamma$, provided a current number of layers N is lower than a maximum number of layers $N_{max}$, N is incremented and the selected value from $\Gamma$ is stored as a peak and neighbors from the selected value are set to zero.

5. The method as in claim 4, wherein each partial image plane is defined as an interval between two transitions, resulting in N−1 image planes.

6. The method as in claim 5, wherein a depth of each image plane is defined as an average depth in a considered interval.

7. The method as in claim 1, wherein the inpainting comprises:
   applying a morphological dilation in an occluded region to generate an inpainting input image frame;
   defining a binary mask corresponding to the inpainting input image frame; and
   computing target color pixels based at least in part on the inpainting input image frame.

8. The method as in claim 7, wherein the target color pixels correspond to pixels from image masked at least in part on the inpainting input image frame.

* * * * *

UNITED STATES PATENT AND TRADEMARK OFFICE
CERTIFICATE OF CORRECTION

PATENT NO. : 11,704,778 B2
APPLICATION NO. : 17/201516
DATED : July 18, 2023
INVENTOR(S) : Diogo Carbonera Luvizon et al.

It is certified that error appears in the above-identified patent and that said Letters Patent is hereby corrected as shown below:

In the Claims

Column 13, Line 25:
In Claim 1, delete "a" and insert --an--.

Column 14, Line 6:
In Claim 2, delete "the" and insert --a--.

Signed and Sealed this
Twelfth Day of September, 2023

Katherine Kelly Vidal
Director of the United States Patent and Trademark Office